US009257045B2

(12) United States Patent
Zobel et al.

(10) Patent No.: US 9,257,045 B2
(45) Date of Patent: Feb. 9, 2016

(54) METHOD FOR DETECTING A TRAFFIC LANE BY MEANS OF A CAMERA

(75) Inventors: Matthias Zobel, Wasserburg (DE); Stefan Heinrich, Achern (DE); Wladimir Klein, Lindau (DE)

(73) Assignee: Conti Temic microelectronic GmbH, Nuremberg (DE)

(*) Notice: Subject to any disclaimer, the term of this patent is extended or adjusted under 35 U.S.C. 154(b) by 0 days.

(21) Appl. No.: 14/234,485

(22) PCT Filed: Jul. 6, 2012

(86) PCT No.: PCT/DE2012/100202
§ 371 (c)(1),
(2), (4) Date: Jan. 23, 2014

(87) PCT Pub. No.: WO2013/020550
PCT Pub. Date: Feb. 14, 2013

(65) Prior Publication Data
US 2014/0152432 A1  Jun. 5, 2014

(30) Foreign Application Priority Data

Aug. 5, 2011  (DE) .......................... 10 2011 109 569

(51) Int. Cl.
*B60Q 1/00* (2006.01)
*G08G 1/16* (2006.01)
*G06K 9/00* (2006.01)

(52) U.S. Cl.
CPC ............ *G08G 1/167* (2013.01); *G06K 9/00798* (2013.01)

(58) Field of Classification Search
CPC .......................... B60T 2201/08; G08G 1/167
USPC ....................... 340/435, 436, 425.5, 933, 937
See application file for complete search history.

(56) References Cited

U.S. PATENT DOCUMENTS

| 6,269,308 | B1 | 7/2001 | Kodaka et al. |
| 7,091,838 | B2 | 8/2006 | Shimakage |
| 7,289,059 | B2 | 10/2007 | Maass |
| 7,382,236 | B2 | 6/2008 | Maass et al. |
| 7,411,486 | B2 | 8/2008 | Gern et al. |
| 7,782,179 | B2* | 8/2010 | Machii et al. ................. 340/435 |
| 8,004,428 | B2 | 8/2011 | Koenig |
| 8,184,859 | B2 | 5/2012 | Tanji |
| 8,301,344 | B2 | 10/2012 | Simon et al. |
| 8,330,592 | B2 | 12/2012 | Von Zeppelin et al. |
| 8,354,944 | B2 | 1/2013 | Riegel et al. |
| 8,457,359 | B2 | 6/2013 | Strauss et al. |
| 8,466,806 | B2* | 6/2013 | Schofield ...................... 340/903 |
| 8,543,254 | B1 | 9/2013 | Schut et al. |
| 8,615,357 | B2* | 12/2013 | Simon ........................... 701/301 |
| 8,842,884 | B2 | 9/2014 | Klein et al. |
| 2001/0016798 | A1 | 8/2001 | Kodaka et al. |
| 2004/0143381 | A1 | 7/2004 | Regensburger et al. |
| 2005/0004731 | A1 | 1/2005 | Bohm et al. |
| 2006/0151223 | A1 | 7/2006 | Knoll |
| 2006/0161331 | A1* | 7/2006 | Kumon et al. ................. 701/96 |
| 2008/0027607 | A1 | 1/2008 | Ertl et al. |
| 2008/0204212 | A1 | 8/2008 | Jordan et al. |
| 2010/0098297 | A1 | 4/2010 | Zhang |
| 2010/0157058 | A1 | 6/2010 | Feiden |
| 2011/0199200 | A1 | 8/2011 | Lueke et al. |
| 2011/0313665 | A1 | 12/2011 | Lueke et al. |
| 2012/0277957 | A1 | 11/2012 | Inoue et al. |
| 2014/0088862 | A1 | 3/2014 | Simon |
| 2014/0324325 | A1 | 10/2014 | Schlensag et al. |
| 2015/0149076 | A1 | 5/2015 | Strauss et al. |

FOREIGN PATENT DOCUMENTS

| DE | 103 55 807 | 7/2004 |
| DE | 102004011699 | 9/2004 |
| DE | 103 36 638 | 2/2005 |
| DE | 102004030752 | 1/2006 |
| DE | 102004057296 | 6/2006 |
| DE | 102005033641 | 1/2007 |
| DE | 102005039167 | 2/2007 |
| DE | 102005063199 | 3/2007 |
| DE | 102005046672 | 4/2007 |
| DE | 102006020631 | 11/2007 |
| DE | 102007016868 | 10/2008 |
| DE | 102008020007 | 10/2008 |
| DE | 102009009211 | 9/2009 |
| DE | 102009016562 | 11/2009 |
| DE | 102009039450 | 5/2010 |
| DE | 102009028644 | 2/2011 |

(Continued)

OTHER PUBLICATIONS

PCT Examiner Jeroen Bakker, International Search Report of the International Searching Authority for International Application PCT/DE2012/100202, mailed Feb. 20, 2013, 4 pages, European Patent Office, HV Rijswijk, Netherlands.
PCT Examiner Agnès Wittmann-Regis, PCT International Preliminary Report on Patentability including English Translation of PCT Written Opinion of the International Searching Authority for International Application PCT/DE2012/100202, issued Feb. 11, 2014, 8 pages, International Bureau of WIPO, Geneva, Switzerland.
German Examiner Ottmar Kotzbauer, German Search Report for German Application No. 10 2011 109 569.5, dated May 2, 2012, 5 pages, Muenchen, Germany, with English translation, 5 pages.
Claudio Caraffi et al., "Off-Road Path and Obstacle Detection Using Decision Networks and Stereo Vision", IEEE Transactions on Intelligent Transportation Systems, IEEE, Piscataway, NJ, USA, vol. 8, No. 4, Dec. 1, 2007, pp. 607 to 618, XP011513050, ISSN: 1524-9050.

(Continued)

*Primary Examiner* — Toan N Pham
(74) *Attorney, Agent, or Firm* — W. F. Fasse

(57) ABSTRACT

A method of detecting a roadway edge and/or a traffic lane on a roadway includes:
  acquiring at least one image of surroundings of a vehicle with a camera;
  detecting a driving corridor from the at least one image; and
  performing a structure detection on the at least one image while taking the determined driving corridor into consideration in order to determine a course of a roadway edge from the at least one image.

20 Claims, No Drawings

(56) References Cited

FOREIGN PATENT DOCUMENTS

| EP | 0 640 903 | 3/1995 |
|----|-----------|--------|
| EP | 1 089 231 | 4/2001 |
| EP | 1 346 877 | 9/2003 |
| EP | 1 383 100 | 1/2004 |
| EP | 1 398 684 | 3/2004 |
| EP | 1 414 692 | 5/2004 |
| EP | 2 189 349 | 5/2010 |
| WO | WO 2004/047449 | 6/2004 |
| WO | WO 2004/094186 | 11/2004 |

OTHER PUBLICATIONS

Pangyu Jeong et al., "Efficient and Robust Classification Method Using Combined Feature Vector for Lane Detection", IEEE Transactions on Circuits and Systems for Video Technology, IEEE Service Center, Piscataway, NJ, USA, vol. 15, No. 4, Apr. 1, 2005, pp. 528 to 537, XP011129359, ISSN: 1051-8215.

Office Action in European Patent Application No. 12 743 662.4, mailed Nov. 11, 2015, 8 pages, with partial English translation, 2 pages.

* cited by examiner

METHOD FOR DETECTING A TRAFFIC LANE BY MEANS OF A CAMERA

FIELD OF THE INVENTION

The invention relates to a method for detecting a traffic lane by means of a vehicle camera.

BACKGROUND INFORMATION

Camera-based driver assistance systems that detect the course of one's own roadway lane (called the ego-lane herein) on the basis of road markings, such as Lane Departure Warning (LDW) systems, have established themselves on the market in the meantime. In particular areas of application, the use of such systems is already mandatory.

Moreover, assistance systems for lane keeping support can intervene in vehicle steering. For example, EP 1414692 B1 shows a method for operating a driver assistance system of a vehicle with servo-assisted steering. A CCD camera covers, i.e. monitors or detects, the surroundings of the vehicle and estimates particularly the course of the traffic lane therefrom. The surroundings data are compared with motion data of the vehicle. On the basis of said comparison, support of the driver's steering operation can be initiated.

Typically, modern driver assistance systems detect the course of the markings of the ego-lane and of the adjacent traffic lanes and estimate therefrom the position of one's own vehicle or subject vehicle (called the ego-vehicle herein) relative to the lane markings.

DE 10 2005 033 641 A1 describes a display device with traffic lane detection presenting lane markings of the detected traffic lane on a display in such a manner that a quality of traffic lane detection is visible. It is possible to define, e.g., a brightness contrast or color contrast for grading the quality of traffic lane detection (detection is good, poor and impossible), said contrast being required for good detection or at least for poor detection. If the road marking is interrupted on a certain stretch of road and thus cannot be detected so that it is only possible to extrapolate the adjacent road markings for that gap, a lane marking representation differing from that of a consistently and reliably detected road marking is selected. It is also possible to include pavement boundary markings (e.g., delineator posts) in traffic lane detection.

In contrast to freeways and developed national highways, there are many roads that have no road markings or that are only partially provided with road markings. On many country roads, for example, only the middle of the pavement is marked as a separating line between the two traffic lanes. In most cases, there are no lateral boundaries and the drivers orientate themselves by delineator posts or by the surroundings or by the lateral boundary of the pavement. Modern driver assistance systems for lane detection notice the absence of markings and turn themselves off completely or switch over to appropriate modes in which only the existing markings are taken into consideration or take the quality of traffic lane detection into consideration when displaying the traffic lane as described above.

Future systems will have to be capable of detecting the ego-lane irrespective of the presence of markings since the demands on driver assistance systems are constantly increasing, especially with regard to autonomous safety functions, such as Emergency Brake Assist and Emergency Steer Assist.

SUMMARY OF THE INVENTION

It is thus an object of embodiments of the invention to specify a method for detecting the traffic lane that is capable of reliably detecting and outputting the traffic lane in spite of incomplete or missing road markings.

This object can be achieved by embodiments of the invention as defined in the claims. The subclaims reveal advantageous further developments of the invention, wherein combinations and further developments of individual features are also possible.

An embodiment of the invention is based on the idea that a roadway edge or shoulder (called the verge herein) can be generally detected by means of a camera, regardless of the presence of lane markings, and the traffic lane can be estimated from the position of the verge, or the position of the verge is at least taken into consideration when detecting the traffic lane.

The detection of verges is a challenging task since the surfaces of pavements and of verges are generally different so that there is no universal pavement-verge pattern.

DETAILED DESCRIPTION OF THE EXAMPLE EMBODIMENTS OF THE INVENTION

An embodiment of an inventive traffic lane detection method comprises the following steps: image acquisition, corridor detection, and structure detection.

Corridor detection serves to determine, first of all, the free space in front of the vehicle from the available image information and to thereby control subsequent structure detection that determines the actual verge from the image information.

In the next step (structure detection), pattern recognition methods are preferably used, said methods determining the course of the traffic lane boundary while taking the determined corridor into consideration. The determined course of the verge usually corresponds to the traffic lane boundary.

The advantage of an inventive method consists in the fact that taking the verge into consideration enhances the availability and reliability of traffic lane detection.

According to a preferred embodiment, a 3D reconstruction of the surroundings of the vehicle can be created by means of a stereo camera and the driving corridor can be determined from said reconstruction. Assuming that the pavement is relatively even, a threshold value can be applied to the 3D information and regions that exceed a particular height can thus be excluded as corridors.

Alternatively, spatial information about the surroundings of the vehicle can be obtained from a sequence of images acquired by a mono camera. There are, for example, structure-from-motion methods, in which the spatial structure of the acquired scenes can be inferred from temporal changes in the image information (optical flow).

For driving-corridor detection and structure detection, results of previous detections are advantageously taken into consideration, wherein said results are suitably filtered and weighted (e.g., Kalman filter).

Corridor detection is preferably supported by information about the dynamics of the ego-vehicle, i.e., data of at least one vehicle dynamics sensor that are present on the vehicle bus, such as speed, yaw rate, steering angle, etc.

In a preferred embodiment, data of further surroundings sensors are also taken into consideration for corridor detection, e.g., by merging the camera data with the 3D information from radar sensors or laser sensors.

In an advantageous realization of the invention, the detected driving corridor can restrict the search area for an image analysis in structure detection. The restriction to relevant image sections results in a better utilization of resources and also reduces the probability of detection errors.

Preferably, structure detection is only performed in an area of the at least one image in which at least the detected driving corridor is situated. For this purpose, the determined 3D corridor can be projected into the available image information and the range for structure detection can thus be restricted. For example, region segmentation can then be performed in the determined corridor (while advantageously taking color information into consideration) in order to determine the boundary of the ego-lane. Region segmentation serves to distinguish at least between the pavement and the region next to the pavement (e.g., meadow, curbstone, sand).

It is also possible to employ edge-based methods that determine the lateral end of the pavement from intensity differences in the image information.

In an advantageous realization of the invention, structure detection is exclusively or supplementally based on a correlation analysis, in which the image or the image detail is compared with learned patterns of typical verges. Therefore, correlation-based approaches are an alternative in which suitable templates of the pavement are compared with the available image information and the presence of the verge is inferred from the matches and deviations.

Preferably, information about the determined verge or about the estimated traffic lane can be outputted in a further procedure step. For this purpose, the information about the detected verges can be put, in the output step, in a form that is suitable for subsequent processing in one's own system or in other control devices.

The course of the pavement is advantageously represented as parameter values of a model (e.g., clothoid). It is also possible to use open traverses.

Ideally, the course can be indicated in 3D coordinates (in real space).

The method described herein can be advantageously employed together with existing marking-detecting methods in order to obtain a more comprehensive description of traffic lanes.

For this purpose, e.g., the available results can be suitably merged and processed or the two methods can influence each other advantageously. For example, a detected marking of the middle can be used to adjust the search area for the verge to the course of said marking.

In combination, the results can also be used for mutual plausibilization.

Generally, this is also possible in combination with other sensors, e.g., plausibilization on the basis of the traffic lane course estimated by a radar system.

In the following, an exemplary embodiment of an inventive method will be specified.

A vehicle is equipped with a mono camera that is arranged inside the windshield, covers that part of the surroundings which is in front of the vehicle, and continually acquires images. From a sequence of images, spatial structures are reconstructed from the contents of the images by means of the optical flow. The free space in front of the vehicle is determined from the spatial structures in order to determine the corridor for the vehicle, wherein the vertical dimension (height) of the structure on which the vehicle is located is analyzed. The position of a potential free space into which the vehicle can move is inferred from the height profile. The vehicle corridor corresponds to all potential free spaces in front of the vehicle.

The position of the vehicle corridor in the image is now used to specifically detect structures there, e.g., by means of region segmentation. During region segmentation, the image is segmented, in the region of the vehicle corridor, into the travel surface, the adjacent area (e.g., meadow), elevations (e.g., crash barrier, post, curbstone), etc. For example, brightness criteria, color criteria, size criteria and/or edge criteria can be used for segmentation.

As a result thereof, the verge is determined as the border between the travel surface region and an adjacent region.

The course of the detected verge can now be outputted. On the one hand, the verge region in the image can be forwarded to a lane marking detection unit so that it becomes possible to detect said markings in the vicinity of the verge more easily and faster. On the other hand, the course of the verge can be outputted to a controlling means of a steering assist unit in real coordinates or as parameter values of a clothoid.

The invention claimed is:

1. A method for traffic lane detection in a driver assistance system of a vehicle, comprising the following steps performed in the driver assistance system:
   with a camera, acquiring at least one image of surroundings of the vehicle;
   detecting a driving corridor from the at least one image;
   performing structure detection in the at least one image while taking the detected driving corridor into consideration to detect a roadway edge and to determine a course of the roadway edge from the at least one image; and
   based on the determined course of the roadway edge, estimating a position of a traffic lane to perform the traffic lane detection.

2. The method according to claim 1, wherein the camera is a stereo camera and information about a height of an area in front of the vehicle in the image is analyzed for detecting the driving corridor.

3. The method according to claim 1, wherein the camera is a mono camera, by which a sequence of successive images of the surroundings of the vehicle is acquired, wherein a spatial structure of at least motionless aspects of the surroundings of the vehicle is inferred from changes in the successive images and information about a height of the spatial structure of the motionless aspects of the surroundings of the vehicle in front of the vehicle is analyzed for detecting the driving corridor.

4. The method according to claim 1, wherein results of previous detections are stored and are used as a basis for a comparison for performing the detecting of the driving corridor.

5. The method according to claim 1, wherein data of at least one vehicle dynamics sensor are additionally taken into consideration when detecting the driving corridor.

6. The method according to claim 1, wherein data of at least one radar sensor and/or lidar sensor are additionally taken into consideration when detecting the driving corridor.

7. The method according to claim 1, wherein the structure detection is only performed in an area of the at least one image in which the detected driving corridor is situated.

8. The method according to claim 1, wherein the structure detection is based on region segmentation of the at least one image.

9. The method according to claim 1, wherein the structure detection is based on a correlation analysis, in which the at least one image or an image detail thereof is compared with stored patterns of typical roadway edges.

10. The method according to claim 1, further comprising a step of outputting to a driver of the vehicle, an information about the determined course of the roadway edge.

11. The method according to claim 1, further comprising taking information about lane markings from a lane marking detection into consideration for the traffic lane detection.

12. The method according to claim 1, further comprising, in the driver assistance system, performing an automatic driver assistance function in response to and dependent on the determined course of the roadway edge.

13. The method according to claim 1, wherein results of previous detections are stored and are used as a basis for a comparison for performing the structure detection to detect the roadway edge.

14. A method of operating a driver assistance system of a vehicle to determine a traffic lane on a roadway on which the vehicle is driving, comprising steps:
  a) with a camera, producing image data of surroundings of the vehicle including a driving surface of the roadway and an adjacent area that is adjacent to the driving surface and off of the roadway;
  b) in the driver assistance system, performing a structure detection on the image data regarding the driving surface of the roadway and the adjacent area, and from the structure detection detecting a physical roadway edge of the driving surface of the roadway as a border between the driving surface and the adjacent area;
  c) in the driver assistance system, performing a lane determination comprising estimating a position of the traffic lane on the roadway relative to the physical roadway edge; and
  d) outputting from the driver assistance system to a driver of the vehicle an information regarding the position of the traffic lane or the physical roadway edge, or performing with the driver assistance system an automatic driver assistance function responsive to and dependent on the position of the traffic lane or the physical roadway edge.

15. The method according to claim 14, wherein the lane determination is performed without consideration of lane lines or other roadway markings on the roadway, and whether or not there are lane lines or other roadway markings present on the roadway.

16. The method according to claim 14, further comprising detecting, in the image data, lane lines or other roadway markings on the roadway, and wherein the lane determination further comprises determining the position of the traffic lane from the detected lane lines or other roadway markings merged or plausibilized with the position estimated relative to the physical roadway edge.

17. The method according to claim 14, further comprising:
  detecting, in the image data, lane lines or other roadway markings, and
  based on a position of the detected lane lines or other roadway markings selecting a portion of the image data to be evaluated in the structure detection to detect the physical roadway edge, or based on a position of the detected physical roadway edge selecting a portion of the image data to be evaluated for the detecting of the lane lines or other roadway markings.

18. The method according to claim 14, wherein the structure detection comprises pattern recognition by comparing an actual pattern of the image data regarding the driving surface of the roadway and the adjacent area, with stored patterns of typical roadway edges.

19. The method according to claim 14, wherein the structure detection comprises performing region segmentation on the image data to segment the image data into distinct regions including a first region containing the driving surface and a second region containing the adjacent area.

20. The method according to claim 14, wherein the step d) comprises the performing of the automatic driver assistance function responsive to and dependent on the position of the traffic lane or the physical roadway edge.

\* \* \* \* \*